Figure 1:
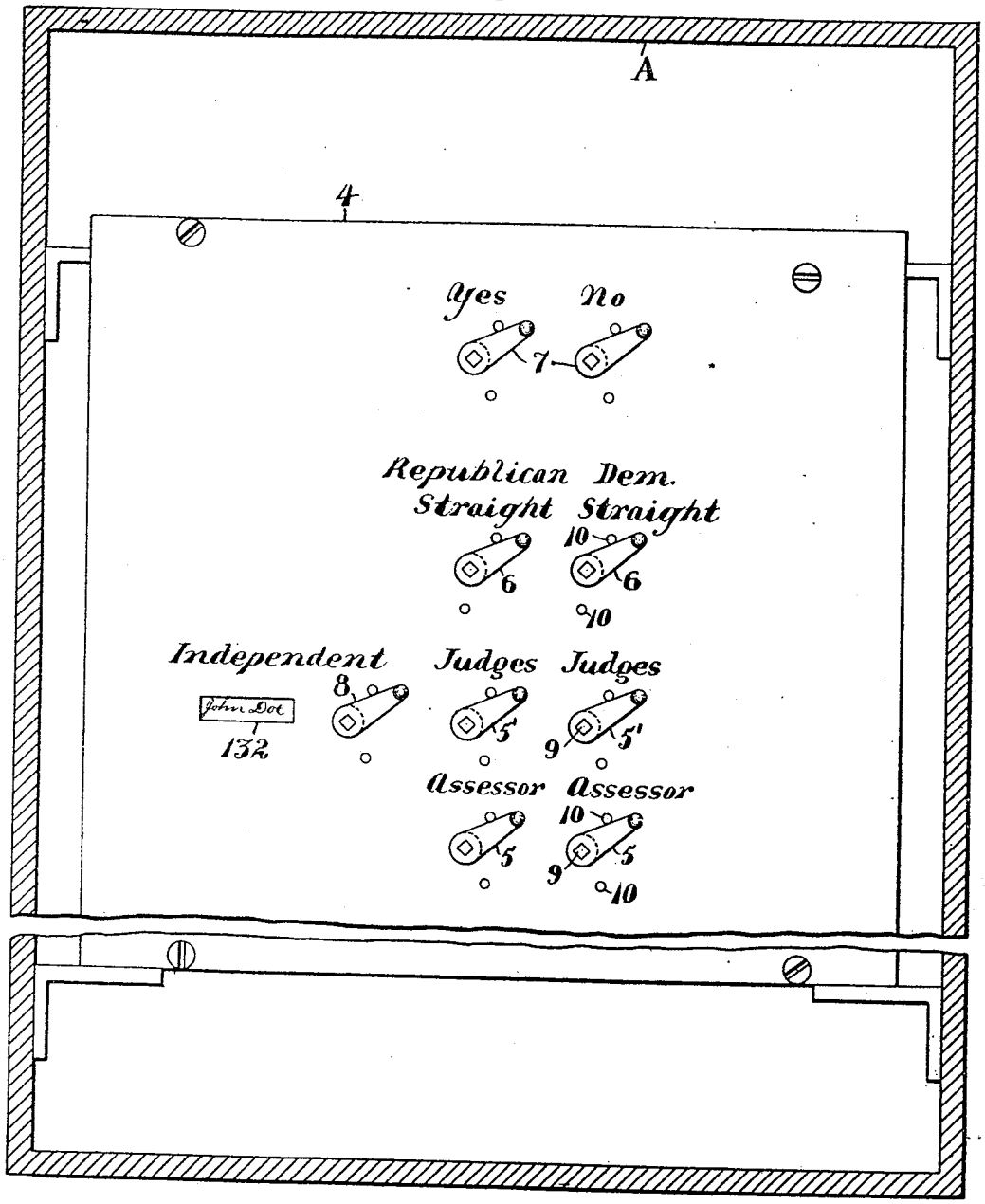

No. 838,242. PATENTED DEC. 11, 1906.
W. M. CUTTER & W. A. SUTFIN.
VOTING MACHINE.
APPLICATION FILED AUG. 2, 1905.

12 SHEETS—SHEET 2.

Witnesses:-
F. C. Fliedner
B. Towse

Inventors
William M. Cutter
Willis A. Sutfin
By Geo. H. Strong
atty.

No. 838,242. PATENTED DEC. 11, 1906.
W. M. CUTTER & W. A. SUTFIN.
VOTING MACHINE.
APPLICATION FILED AUG. 2, 1905.
12 SHEETS—SHEET 3.
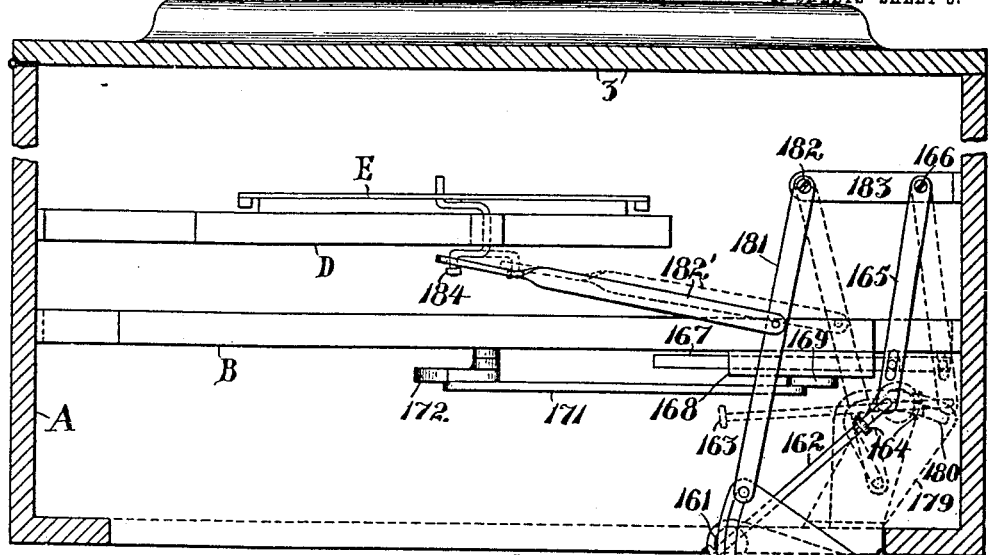
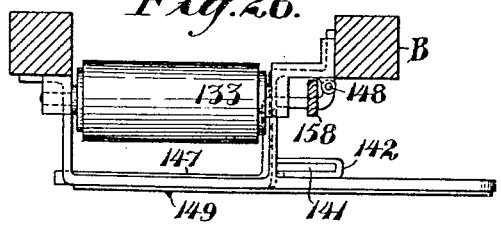
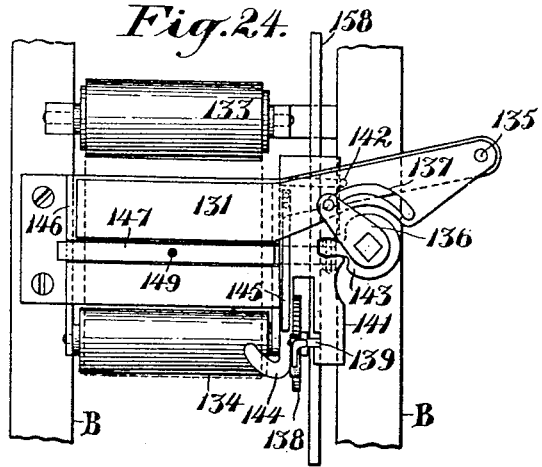
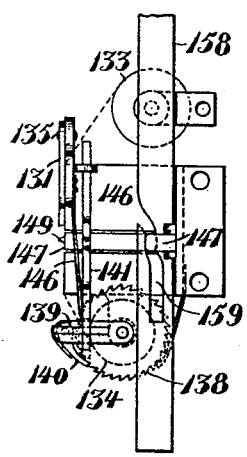
Witnesses:—
F. C. Fliedner
J. S. Monroe
Inventors
William M. Cutter
Willis A. Sutfin
By Geo. H. Strong
Atty

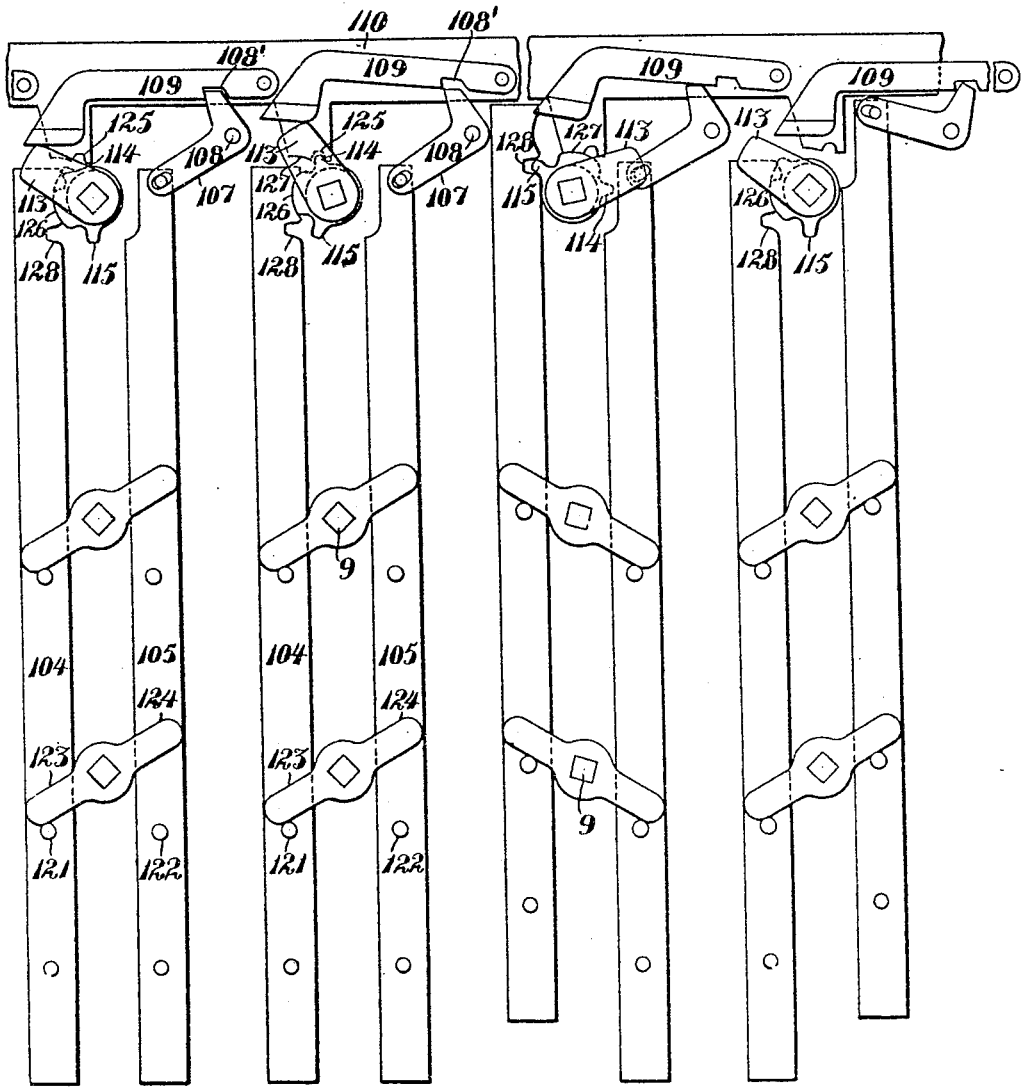

No. 838,242. PATENTED DEC. 11, 1906.
W. M. CUTTER & W. A. SUTFIN.
VOTING MACHINE.
APPLICATION FILED AUG. 2, 1905.
12 SHEETS—SHEET 5.
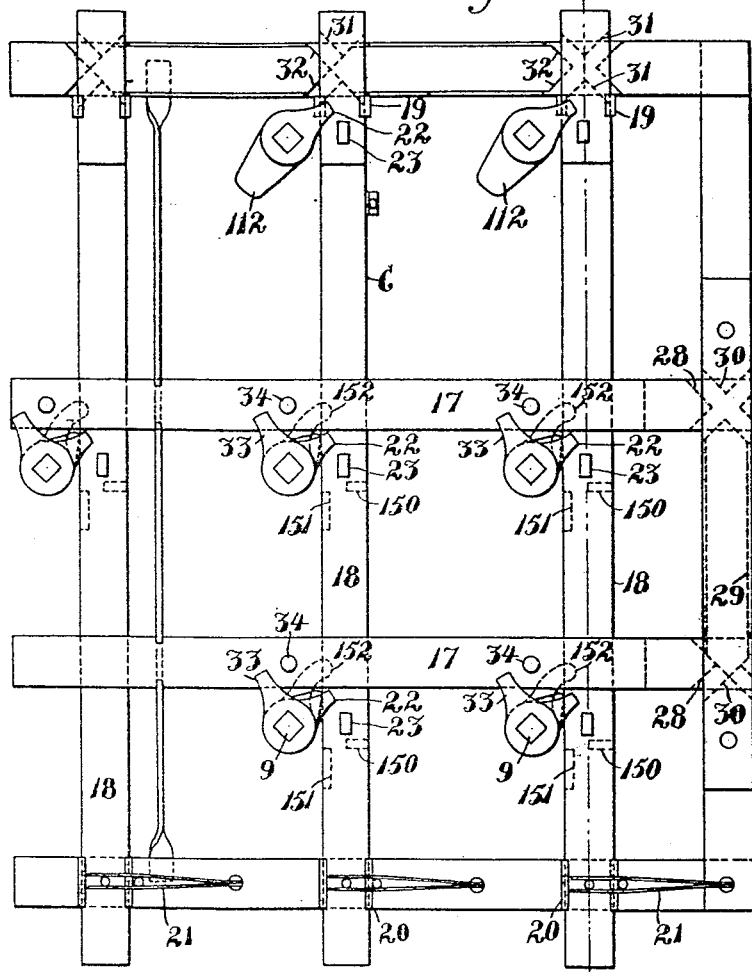
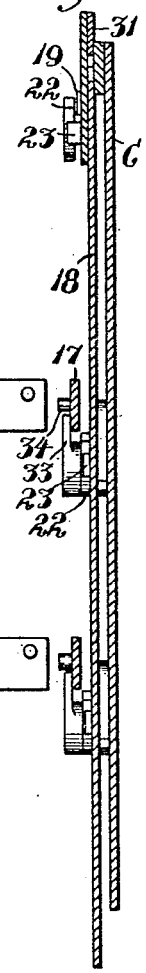
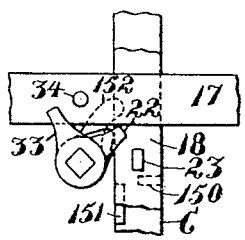
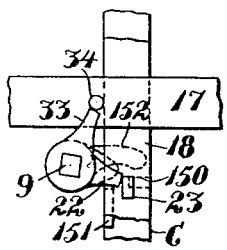
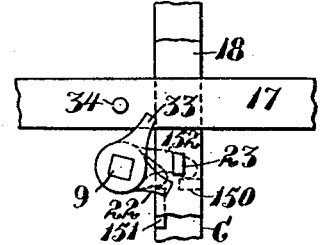

No. 838,242. PATENTED DEC. 11, 1906.
W. M. CUTTER & W. A. SUTFIN.
VOTING MACHINE.
APPLICATION FILED AUG. 2, 1905.
12 SHEETS—SHEET 6.
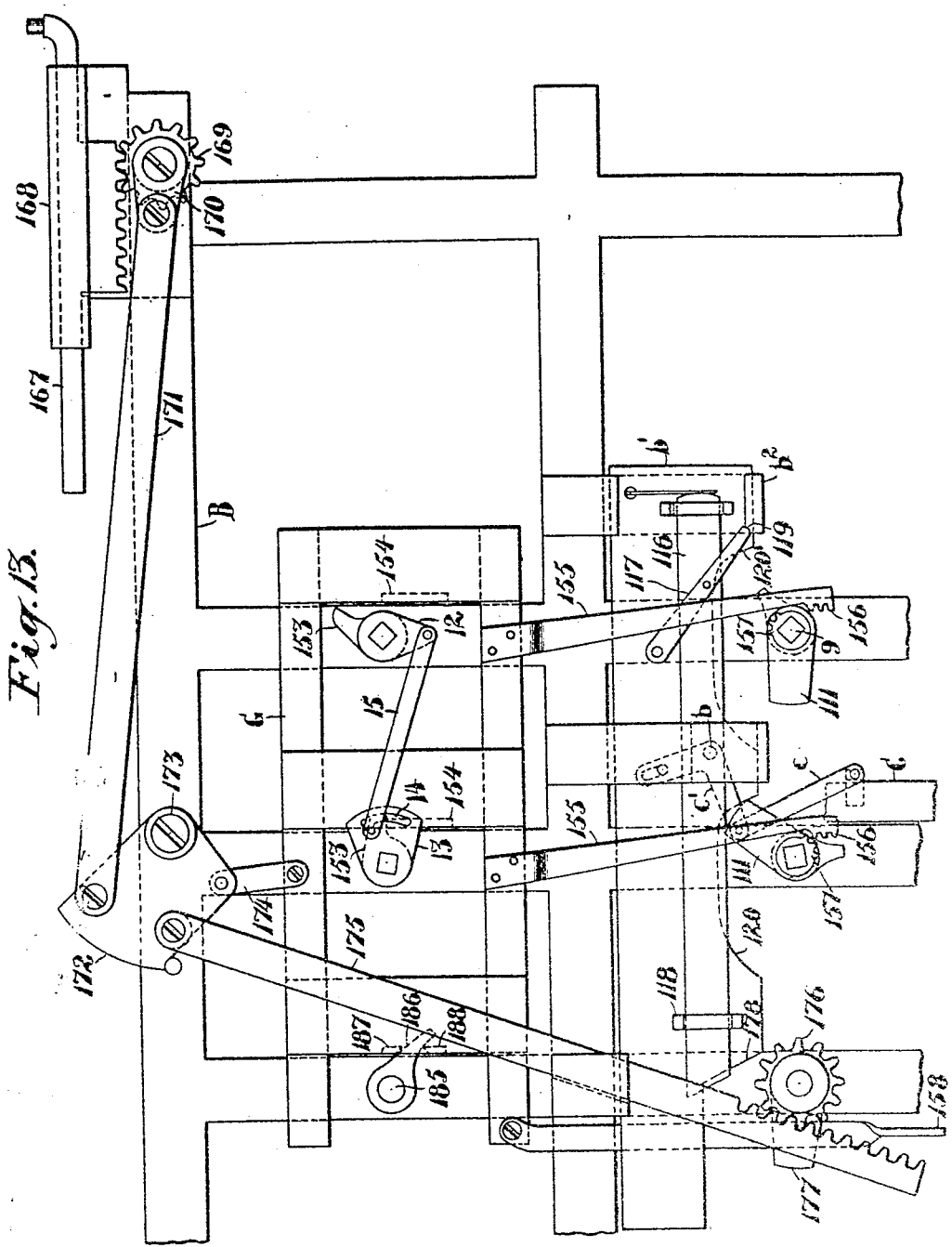
Witnesses:
F. C. Fliedner
B. Bowse
Inventors
William M. Cutter
Willis A. Sutfin
By Geo. H. Strong   Atty

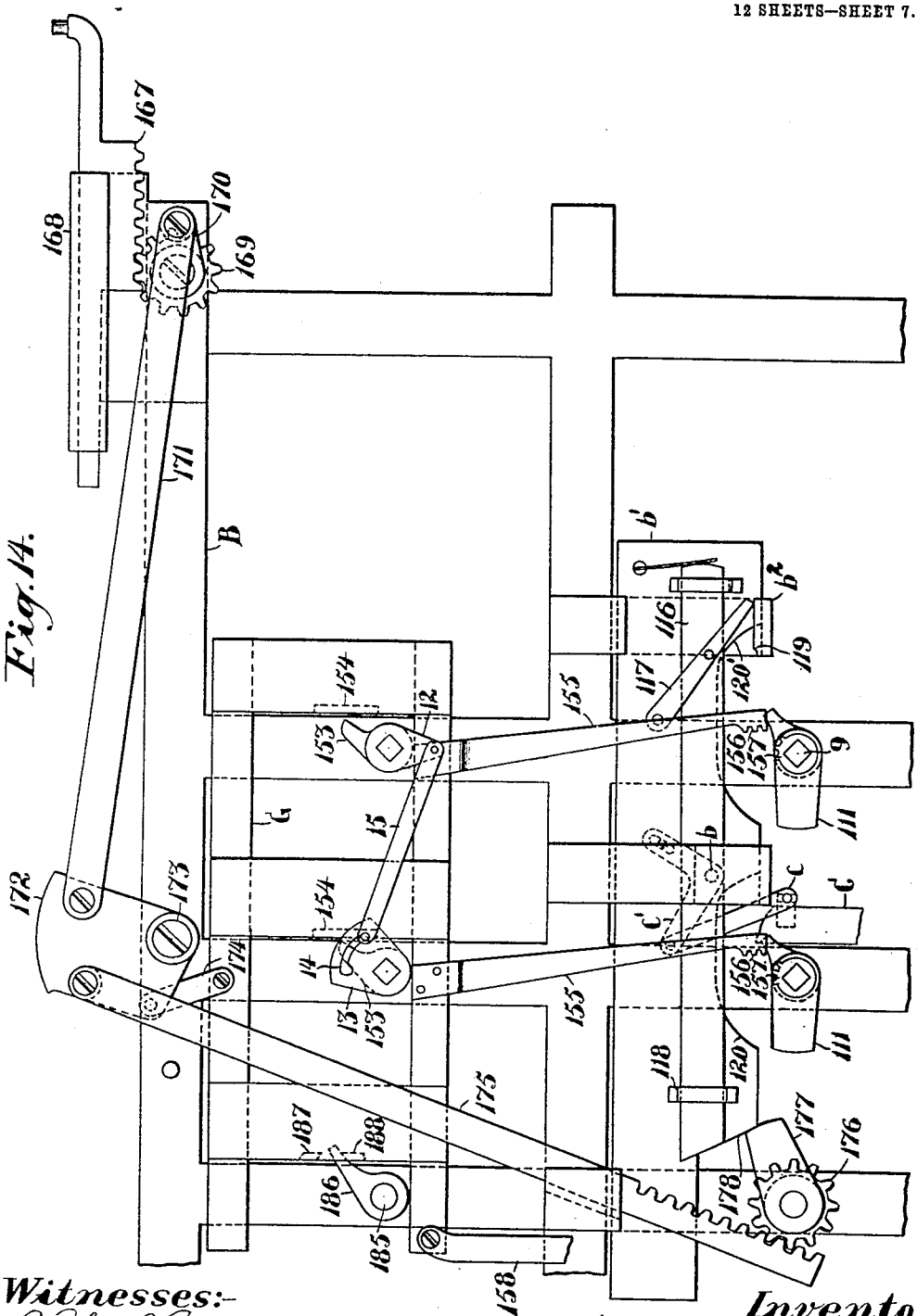

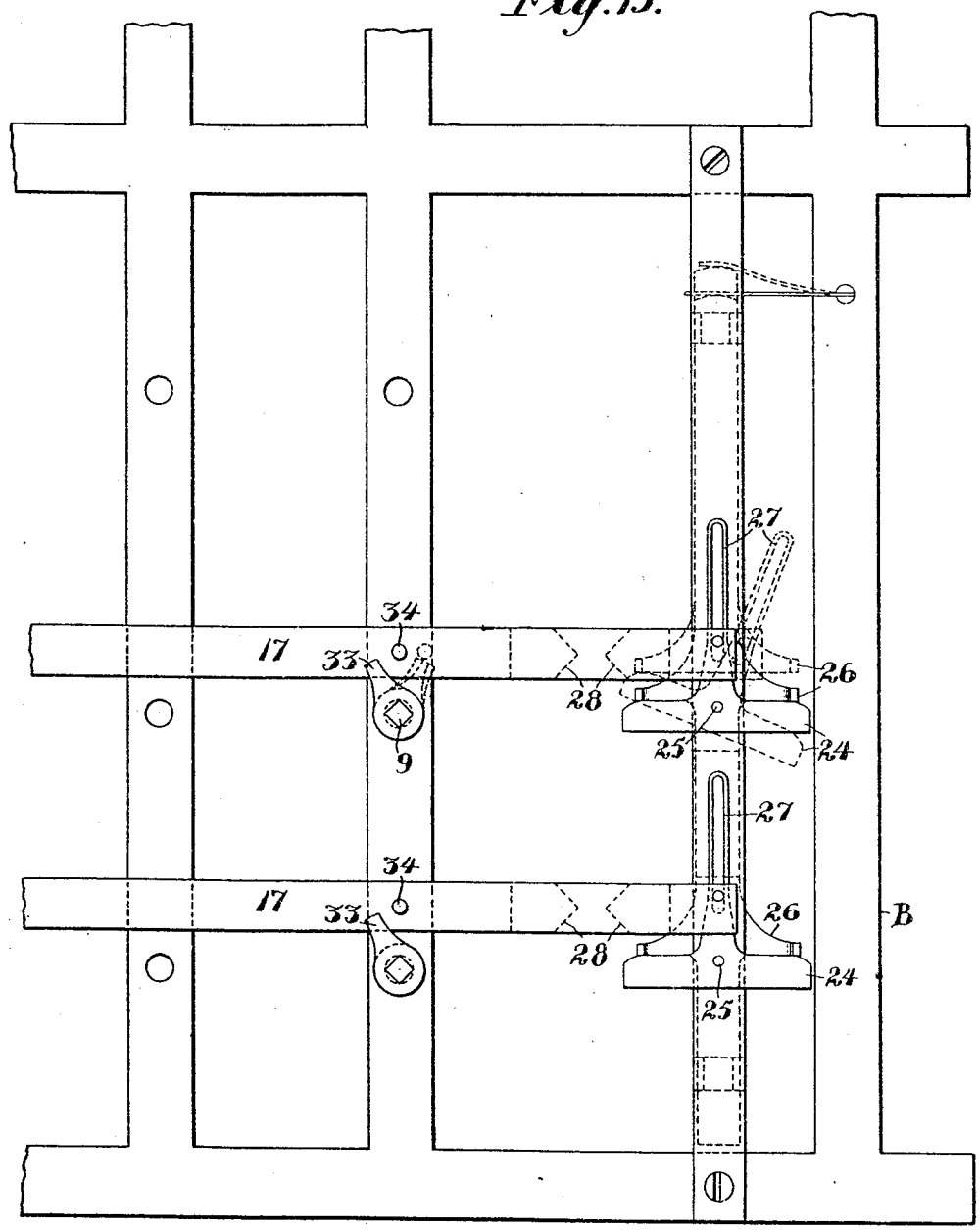

No. 838,242. PATENTED DEC. 11, 1906.
W. M. CUTTER & W. A. SUTFIN.
VOTING MACHINE.
APPLICATION FILED AUG. 2, 1905.

12 SHEETS—SHEET 11.

Witnesses:—
F. C. Fliedner

Inventors
William M. Cutter
Willis A. Sutfin
By Geo. H. Strong
Atty

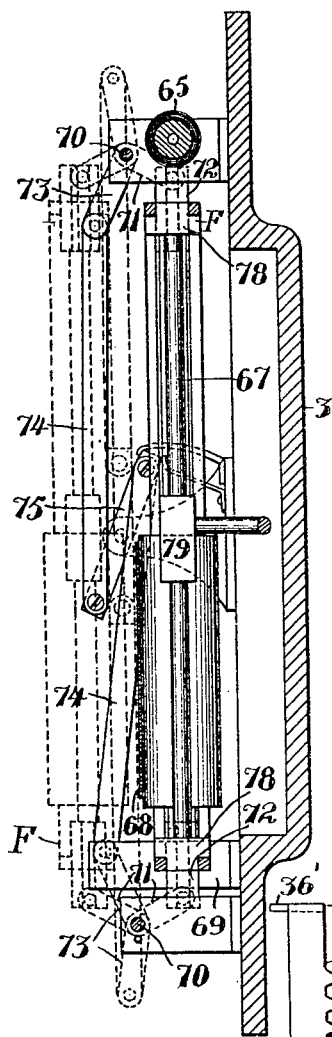

UNITED STATES PATENT OFFICE.

WILLIAM M. CUTTER AND WILLIS A. SUTFIN, OF MARYSVILLE, CALIFORNIA; SAID SUTFIN ASSIGNOR OF ONE-HALF OF HIS RIGHT TO SAID CUTTER.

VOTING-MACHINE.

No. 838,242.     Specification of Letters Patent.     Patented Dec. 11, 1906.

Application filed August 2, 1905. Serial No. 272,316.

*To all whom it may concern:*

Be it known that we, WILLIAM M. CUTTER and WILLIS A. SUTFIN, citizens of the United States, residing at Marysville, in the county of Yuba and State of California, have invented new and useful Improvements in Voting-Machines, of which the following is a specification.

Our invention relates to an improved voting-machine. Its object is to provide a voting-machine which will be simple in construction and operation; which will not be too expensive to manufacture; which will be durable; which will be of convenient shape and size of comparatively light weight; which will allow a voter fullest latitude within the limit of the law to express his choice; which will be absolutely certain in operation; which cannot be tampered with; which will allow its registers to be reset at zero easily or quickly after an election; which will enable an imprint or any number of imprints of the total vote and of the standing of the several candidates to be quickly taken at any time without opening up the machine; which can be easily changed from a single-candidate machine to a multicandidate-machine, or, vice versa, or from either to a partly single and a partly multicandidate machine; which will enable a straight ticket to be easily voted and which will by means of a single straight-ticket key operate all the register mechanisms of all the candidates of the particular party so voted; which will render it absolutely impossible for any one voter to vote more than once for any one candidate or more than once for any one single-candidate office; which will enable an independent voter who writes his choice to change from that choice, cancel the vote, and vote for some one else, and generally it is our object to provide a machine which will meet the multitude of requirements laid down by the statutes of the several States.

The invention consists of the parts and the construction and combination of parts, as hereinafter more fully described and claimed, having reference to the accompanying drawings, in which—

Figure 2:
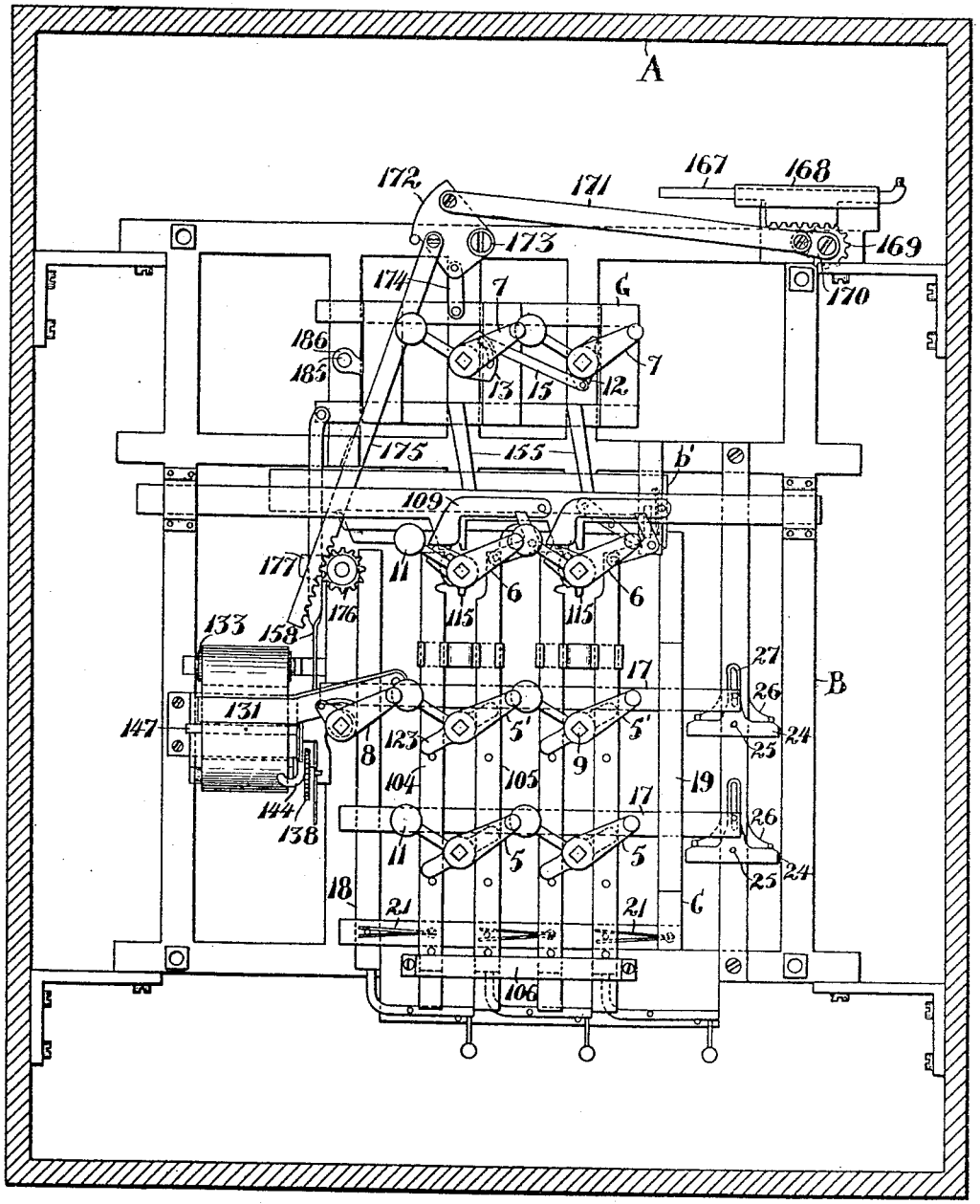
Figure 16:
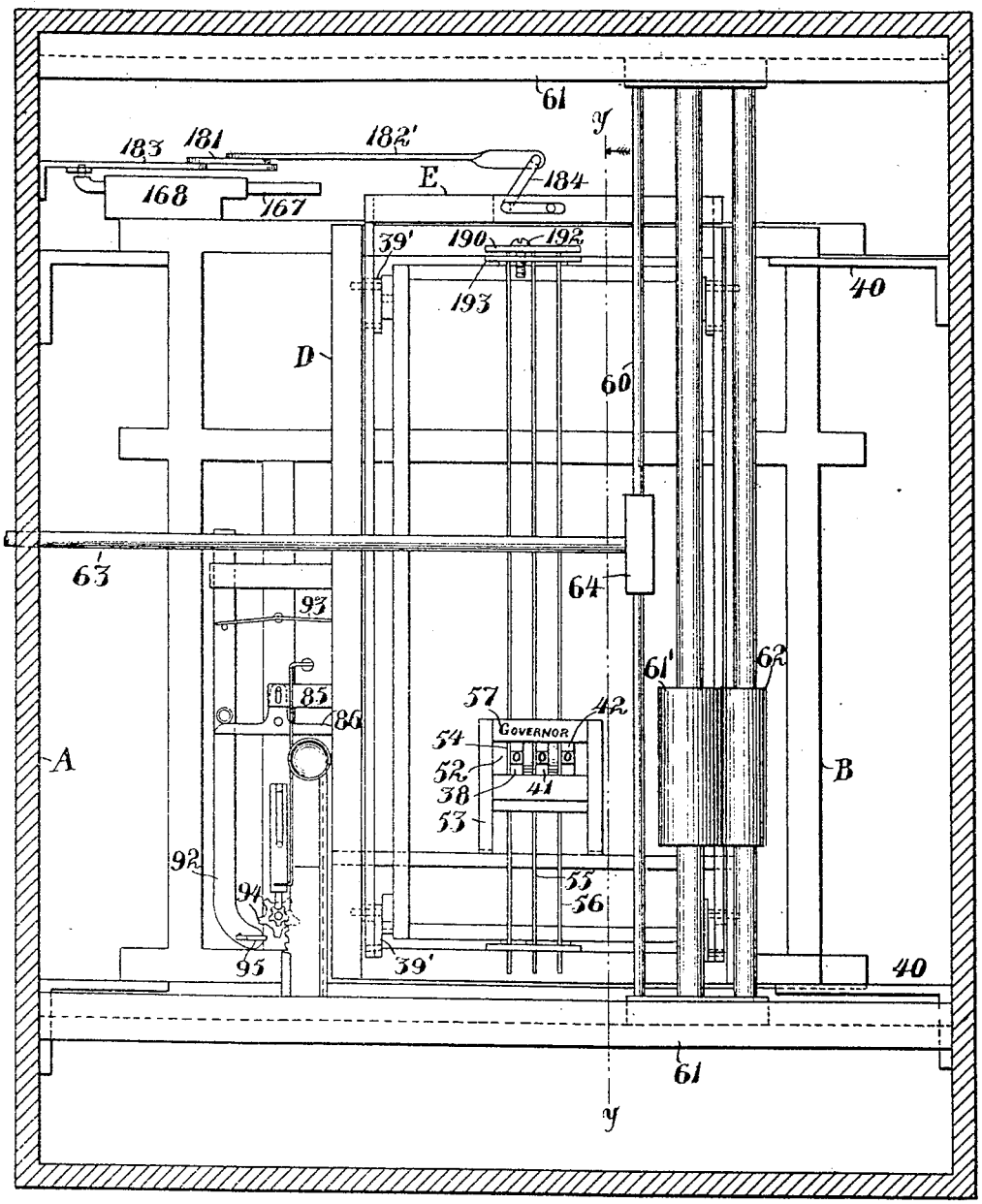
Figure 17:
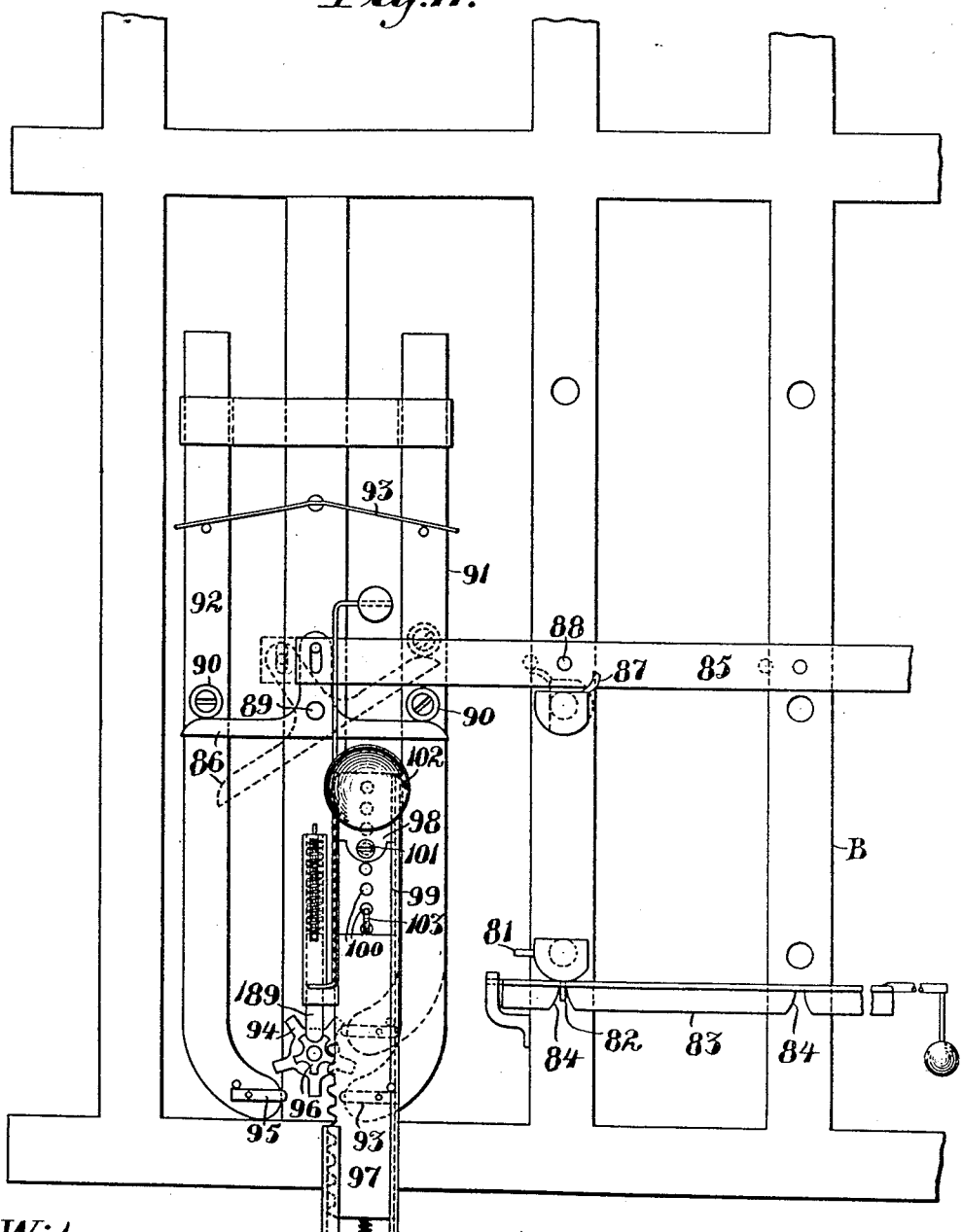
Figure 18:
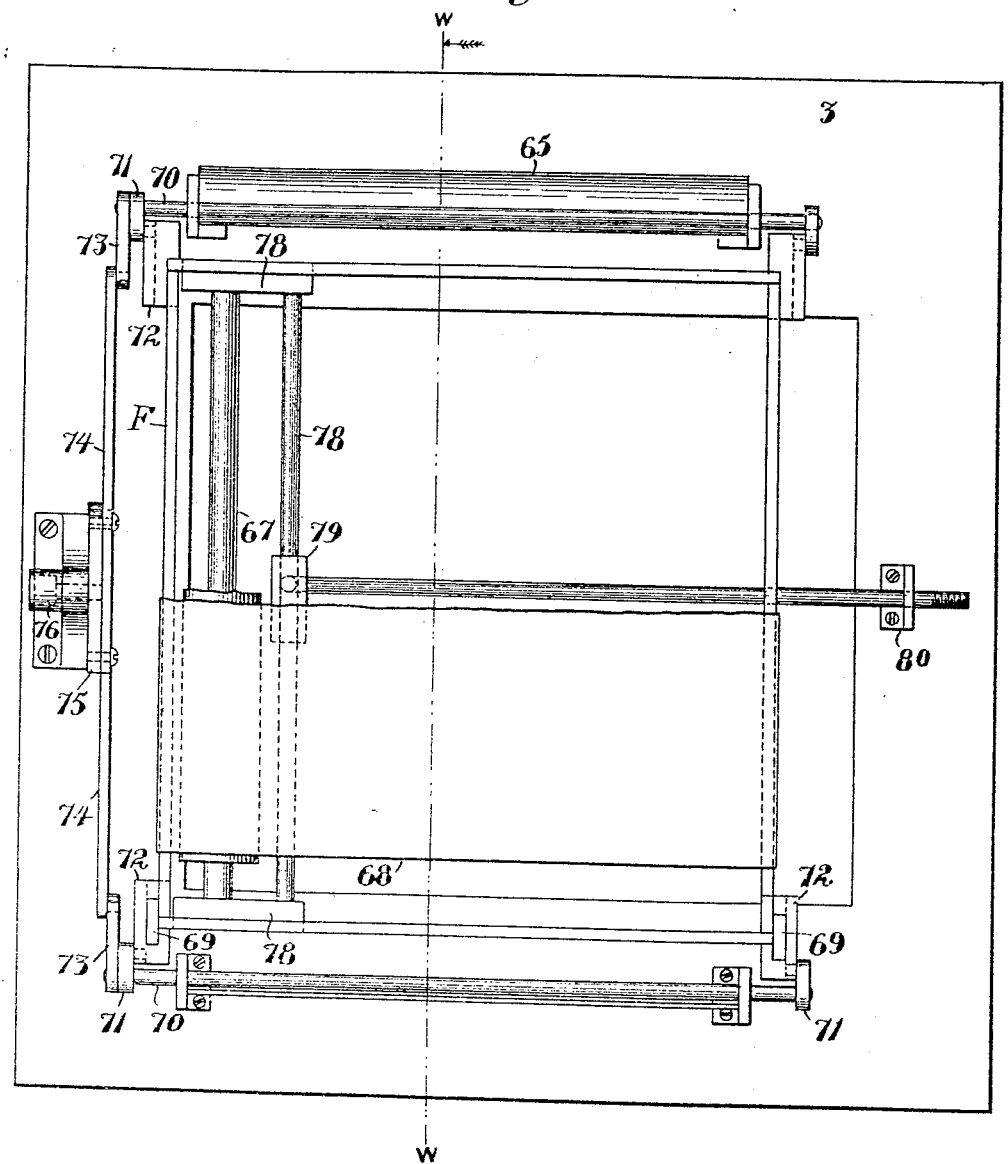

Figure 1 is a front view of the machine with the front door open, showing key arrangement. Fig. 2 is a front view with the faceplate removed. Fig. 3 is a plan view with section through the cabinet and front door open. Figs. 4, 5, 6, and 7 represent diagrammatically different portions of certain of the straight-ticket-operating bars. Fig. 8 is a plan of the resetting-carriage C for the regular-ticket-voting keys with its locking-bars. Fig. 9 is a section on X X, Fig. 8. Figs. 10, 11, 12 represent diagrammatically the several positions of the vertical and horizontal locking-bars of carriage C. Fig. 13 is a detail of the resetting-carriage for the questions-keys, showing connections with carriage C, all in voting position. Fig. 14 is a view similar to that of Fig. 13 with the carriages in voted or raised position and the keys all locked against movement. Fig. 15 is a detail of the mechanism for holding the horizontal locking-bars 17 in normal operative position. Fig. 16 is a rear view of the machine with the back door open. Fig. 17 is an enlarged detail of part of the mechanism shown in Fig. 16, showing multicandidate-check mechanism and single-candidate locking-bar. Fig. 18 is a view of the rear door, showing the paper-holding and impression means. Fig. 19 is a sectional view on line W W, Fig. 18, dotted position showing apparatus thrown forward to print. Fig. 20 is a section on Y Y, Fig. 16, showing register mechanism. Figs. 21, 22, 23 show the several positions of the register-wheels and register-wheels carrier. Fig. 24 is a front view of the independent-voting mechanism. Fig. 25 is a side elevation of same looking from the right of Fig. 24. Fig. 26 is a plan view of same. Fig. 27 is a rear view of the register-wheel.

A represents a suitable cabinet or case containing the operating mechanism and shown as provided with a front door 2 and a rear door 3. The latter is closed and locked during an election and is only opened to reset the registers after an election or to give access to the printing mechanism or some other point of the machine needing attention, change, or inspection, or for some other like purpose. The front door is closed after each voter has finished voting and operates to register each vote, tally the total vote, and reset the machine ready for the next voter.

When the door 2 is open, there is exposed to view a vertical face-plate 4, with series of voting-keys 5 5' arranged generally in appropriate columns corresponding to the different parties—republican, democratic, &c.—a "straight-ticket" key 6 for each column, and also one or more sets of two or more keys 7, designated herein as "questions-keys" for voting "yes" or "no" on constitutional amendments and other matters of referendum. There are also as many "independent-voting" keys 8 as there are keys in a regular-party column, although only one independent key 8 is here represented.

We have shown the machine—that is, the keys and mechanism operated by them—arranged in a single panel. The machine can be made with a plurality of panels, which will lessen the length of certain locking-bars and other parts hereinafter described and will render the machine more convenient to handle.

Each key has a stem 9, suitably supported to turn in a stationary skeleton frame B within the cabinet, and each key is adapted to be turned one way to indicate a vote and capable of being turned back after such indication to change the vote and leave the voter free to vote for some one else for that office. The movement of any key is limited by suitable stops 10.

The keys may be counterweighted, as at 11, to cause them normally to rest against the top or rearmost stop, indicating the unvoted position.

Each key has in some way associated with it the name of the candidate and the name of the particular office for which he is standing.

For convenience of illustration we have shown only two question-keys 7, two straight-ticket keys 6, two keys 5 for "assessor," one for each party, and representing so-called "single-candidate keys"—that is, only one candidate for that office to be elected—and two keys 5' for "judges," representing "multicandidate-keys"—that is, more than one to be elected for that office. Also only one registering mechanism is shown as connected with a key, since every key on the machine has its individual register and all the registers are alike.

The register mechanisms and everything but the keys themselves are hid behind the face-plate 4 and, except when the back door 3 is opened, securely housed within the cabinet.

Taking up the questions-keys 7, it is observed by reference to Figs. 2, 13, 14 that the key-stem of one key has a crank-arm 12, shown as projecting downward, and the stem of the other key as having an oppositely-projecting plate 13, with a segmental slot 14. A link 15 is pivoted to arm 12 and has a pin at the other end sliding in slot 14, the link serving to connect the two keys 7, so that both cannot be voted by any one voter. Either key may be voted by turning it a quarter-turn to the right; but if one is voted and it is then the desire or scheme of the voter to vote the other the first key will be thrown back automatically and the first vote reversed.

No recordation of a vote is made until the door 2 is closed, as will be seen later. Hence any amount of juggling may be attempted with the keys while the door is open, and votes may be reversed or changed at random, yet when the door is closed there will be tallied only one vote for an office for which there can only be one incumbent, and only the right number of votes for group candidates and only one vote for each candidate, and only one vote pro or contra for matters of referendum, and so on, all as will be seen hereinafter.

The register and printing mechanism for the questions-keys 7 being the same as those for the other keys, their description will be deferred temporarily.

Referring to Figs. 2, 8, 13, 14, C represents a movable frame or carriage, hereinafter designated as the "resetting-carriage," and having a limited vertical sliding movement on suitable guides 16 on the stationary frame B. This resetting-carriage C is for a double purpose; First, as the name implies, it resets the keys after they have been voted by one voter, and places the machine in readiness for the next voter. Second, it enables the straight ticket key to operate all the keys of that particular party and so credit each individual candidate of that party and at that particular time with the vote belonging to him. In all machines with which we are familiar the straight vote is tallied separately as a straight vote and indicates it as such at the close of the election. After taking the totals of all the candidates as shown on the individual registers this straight vote must be added to each candidate of the party. This separate tally of the straight vote is objectionable for many reasons. Among others, it interferes with the strict secrecy of the ballot because it shows to the party managers the number of strict party adherents. Moreover, such separate straight-vote tallying is forbidden by the statutes of some of the States. As will be seen later, our machine adds to the total of each candidate on the ticket the vote that the voter intends to cast for him when he turns down the straight key. The carriage C is hung by a link $c$, Figs. 13, 14, to one arm of a bell-crank lever $c'$, which is fulcrumed to frame B at $b$. The other arm of lever $c'$ is pivoted to a horizontal operating-bar $b'$, sliding in guides $b^2$ on the front of frame B. By reciprocating bar $b'$ carriage C is lifted, as will be described later. 17 represents horizontal bars, and 18 represents vertical locking-bars carried by and sliding in respective guides 19 20 on the carriage C. Each of said bars is movable independently of every other bar, and each vertical bar is held by suitable means, as the springs 21, so as to be normally in an intermediate position of rest and capable of being easily reciprocated in either direction when a key is turned to cause a cam 22 on a key-stem to engage a corresponding lug 23 on a bar 18. The horizontal bars 17 are normally held each in similar position by suitable means, as a rockable inverted-T-shaped member 24, pivoted to frame B at 25 and having its horizontal arms supporting a weight 26, the vertical arm of the inverted-T-shaped piece 24 being slotted, as at 27, to receive a pin in the end of a corresponding bar 17, and permitting the suitable and periodic lifting of the carriage C. The horizontal bars 17 have opposed wedges 28 fixed to and movable with them, the wedges in the several bars being suitably arranged with relation to one another and to a guide 19, which houses a sliding plate or member 29, disposed between every two bars 17 and having wedge-shaped ends corresponding to the space between any two wedges 28. While there are only two horizontal and three vertical locking-bars 17 18 shown, it is understood that this is simply for convenience of illustration and that the number of horizontal bars depends on the number of offices to be filled and the vertical bars on the number of tickets or parties in the field. As there are only two horizontal bars 17 shown, there is consequently only one sliding plate 29. Opposed and in line with each end of plate 29 are the stationary wedges 30. One bar 17 is adapted to reciprocate between one wedge 30 and the adjacent end of the sliding wedge 29, while the other bar 17 is adapted to reciprocate between the other wedge 30 and the corresponding end of member 29. At the same time both bars cannot be reciprocated at the same time, for the reason that if the lower bar is moved first it lifts wedge 29 and blocks the way to the upper bar, and if the upper bar is moved first it blocks the way to the upward movement of wedge 29, which normally rests by gravity on the top surfaces of the wedges 28 on the lower bar and across the path of movement of the latter. The vertical bars 18 have each similar wedges 31, and sliding wedges 32, similar to wedge 29, are reciprocal in suitable guides on carriage C between any adjacent two bars 18. The object of the wedges 31 32 is to prevent the simultaneous movement of any two or more vertical bars 18 or the movement of any vertical bar when another is in other than in normal intermediate position. The reciprocation of the horizontal bars is done by a cam 33 on a key-stem and a corresponding lug 34 on a bar. Lug 23 is so disposed to cam 22 that the key can be turned one way first to depress a vertical bar 18. As the cam passes the lug it allows the bar to flyback to normal. When the key is turned back, the bar 18 will first be lifted and then released to fly back to normal again. So, also, with the bars 17, the lugs 34 are so arranged in regard to the cams 33 that these bars have a movement in either direction according as the keys are turned.

The horizontal locking-bars 17, it will be observed, prevent the simultaneous movement of any two or more keys not in the same horizontal line, while the vertical locking-bars 18 prevent the simultaneous operation of two or more keys in the same horizontal line. Hence by having both the vertical and horizontal locking-bars only one key can be operated at a time, and, except in group-candidate voting, only one candidate can be voted for for any one office, although there is nothing to prevent a voter "changing his mind" and voting for some one else. "Changing one's mind" necessitates, though, the turning back to original position of the key representing the candidate to be crossed.

We will next describe the recording device and show how it is that the simple turning of a key does not operate to complete the record, but allows one to change his mind.

Referring to Figs. 20, 21, 22, 23, the key-stem 9 carries a lateral projection 35 behind frame B, which is engageable with a sliding rack 36 to lift the latter when the stem is turned one way. The stem has another projection 37 to engage the rack to insure its downward movement when the stem is turned back. The rack 36 is slidable in suitable guides on a hinged frame D and is designed for the purpose of actuating the units register-wheel 38. There are any desired number of register-wheels mounted to rotate on shaft 39, which is supported on and movable with the register-carrier E, which is supported on the frame D. A single shaft suffices for all the register-wheels of all the registers for any one horizontal line of voting-keys, and all the register-wheels are carried by and movable with the carrier E. This carrier is here shown as rectangular and as supported at the corners on the hinged frame D by the links 39. The frame D is shown as hinged to the cabinet at 40; but ordinarily (and generally at all times except when it is desired or necessary to change a horizontal row of voting-keys from a single-candidate plan to a multicandidate plan, as described later) the frame D lies parallel with and is rigidly connected to the main stationary frame B. When in this position, the registers are in operative position with the voting-keys. Associated with the units-wheel 38 of each register mechanism are two or more wheels, as 41 42, &c., representing tens, hundreds, and so on. Each wheel has ten numbers from "0" to "9" on its periphery, disposed in relief like unto and acting as printing-type, and suitable means are provided to allow all the wheels to be set at zero, and as one wheel is turned step by step to bring it to "9" this wheel will, at the next movement, move the succeeding wheel one step and so on, all in a manner common to counting-registers. We employ, however, certain novel means to operate the wheels 41 42 synchronously with the units or master wheel 38. The rack 36 is normally in engagement with a pinion 43 on wheel 38. Wheel 41 has a pinion 44, which is normally in mesh with an individual rack 45, and wheel 42 has a pinion 46 normally in mesh with an individual rack 47. The racks 45 47 are slidable in frame D and are capable of operation independently of each other and of rack 36; but rack 36 has a projection 36', extending across the top of racks 45 47 to insure the racks 45 47 always being moved down to normal position when rack 36 is moved back to its normal position ready to be acted on by a key. The "tens-wheel" 41 is turned one step when the "unit-wheel" 38 has made one revolution by means of a pin 48 on wheel 38 engaging a pin 49 on rack 45 to lift the latter and turn the pinion 44 and wheel 41. Similarly when wheel 41 has made one complete revolution a pin 50 on this wheel will engage a pin 51 on rack 47 and operate wheel 42, and so on. The limit of movement, however, of any one of the racks 36, 45, or 47 is such as to turn their respective register-wheels 38, 41, or 42 one step only. Thus turning a key to indicate a vote lifts rack 36 and turns wheel 38, so as to cause a succeeding number to show through an opening 52 in a plate 53, disposed back of the printing and register wheels 38 41 42 and carried by frame D.

Normally frame E hangs down by gravity with all the pinions 43 44 46 in mesh with their respective racks 36 45 47. Turning a voting-key causes rack 36, as just stated, to raise and turn wheel 38 one step. If the progression happens to be from "9" to "0" on the units-wheel, the projection 48 will catch under pin 49 on rack 45, lifting the latter and turning wheel 41 one step. If the voter wishes to change his vote on this candidate, he turns back that key which causes projection 37 to pull down rack 45, and so both register-wheels 38 41 are returned to their original position.

In order actually to record the vote, assuming the rack 36 to have been lifted to turn one or more of the register-wheels in the manner described and left in lifted position, the frame E is moved out to carry the pinions 43 44 46 out of engagement with racks 36 45 47 and out into engagement with other respective and ordinarily-fixed racks 54 55 56. The movement of the frame E is done by lifting on it to cause it to turn on the links 39. As soon as the register-wheels are thus moved to carry their pinions out of mesh with the racks 36 45 47 the latter are all free to be moved down again into normal position without reversing or disturbing any of the register-wheels. The space, however, between the respective racks 36 45 47 and 54 55 56 remains always the same and is such that the teeth of the pinions 43 44 46 are carried into one bank of racks before they are wholly free of the other. In consequence no opportunity is offered by which the register-wheels may be tampered with during the movement of the carrier E.

There is arranged above each opening 52 in the plate 53 certain type-face 57, indicating the name of the candidate and the name of the office for which the candidate stands. When the carrier E is moved rearward to carry the register-wheels away from the influence of racks 36 45 47, a single line of type-numerals on the wheels 38 41 42 corresponding to the total vote to that time for that particular candidate is projected through the opening 52. If an inking-roller is now passed over the exposed type-surfaces 57 and the projected numerals and a sheet of paper pressed against these printing-surfaces, an impression will be obtained which will give the name of the candidate, the office, and the vote at that particular time for that particular candidate.

It is understood that there is an opening 52 in the plate 53 for every candidate, that all the register mechanisms operate alike and tally simultaneously, and that an impression and tally can be taken of all the candidates at one time.

The means for printing the results of the election are as follows, (see Fig. 16:) The inking mechanism comprises a frame 60, reciprocal across plate 53 in guides 61 in the top and bottom of the cabinet and carrying an inking-roller 61 and a distributing-roller 62. To reciprocate the frame 60, a rod 63 is inserted through a hole in the side of the cabinet and screwed into a screw-threaded socket-piece 64 in frame 60. By reciprocating rod 63 the roller 61 is made to pass over the type-face on the plate 53 and on the register-rollers to deposit sufficient ink to make a proper impression. The rear door 3 carries the means, Figs. 18, 19, for making the impression and also supports a roll of paper 65. The end of the paper strip is drawn down over plate 53, but is ordinarily far enough away from the plate to allow the inking-roller to be moved over the plate between the latter and strip without interfering with the strip. The strip passes out through a slot 66 and may be drawn off the roll from the outside. Behind the paper and between it and door 3 is a movable frame F for carrying the sheet against the exposed and opposed printing-surfaces, also a presser-roller 67 and a protective flexible curtain or sheet 68. The frame F is supposed to move to and from door 3 and parallel with it on guides 69, and the movement of the frame is effected through the top and bottom rock-shafts 70, which have arms 71 engaging slotted parts 72 on the frame. The shafts 70 are connected to rock in unison by means of the cranks 73 on the shafts and the links 74, connected to the cranks and to opposite ends of a bar 75. Bar 75 is fixed in the middle to a rockable key-shaft 76, journaled in a support on door 3. When the door 3 is closed, shaft 76 is brought into register with a hole 77 in the cabinet to allow a key or other suitable instrument to be inserted to engage the keyway in shaft 76 and turn it. Doing this causes frame F to carry the paper inward against the plate 53. In order to make the impression, the roller 67, supported in a carriage 78, which is slidable in guides on frame F, is moved back and forth to press against the curtain 68, which lies against the back of the paper and protects the latter from being torn by the roller. The carriage 78 is reciprocated by inserting a rod-section through an opening in the side of the cabinet and screwing it onto the threaded section 79, which is connected with the carriage and which is slidable in and supported by the guide 80 on the inside of the door 3.

We have seen how the horizontal locking-bars 17 and the vertical locking-bars 18 operate to prevent the actuation of any two or more keys simultaneously. We will now describe the means whereby a person is absolutely prevented from voting for two candidates for one office where only one candidate can be elected or from voting more than the correct number for an office where a group is to be elected. First, as to single-candidate voting, the keys representing the names of all the candidates for any one single-candidate office—as assessor, for instance—are arranged in a horizontal line just as the keys of each party are arranged in a vertical line. Referring to Fig. 17, each key-stem of a single-candidate row carries two pins 81 82, arranged about at right angles to one another, but one behind the other and adapted to engage opposite sides of a horizontal rockable angle-bar 83. This bar has notches 84 in its inner edge disposed relative to pins 82 and adapted when any one key is turned to receive the pins 82 on the stems of all the other keys and prevent their being turned. The bar 83 is suitably journaled in the back of frame B and is rocked by turning a key to cause a pin 81 to bear down on the unnotched flange of said bar.

Where the vote is for "group candidates," as judges, supervisors, alderman, &c., the following checking means are employed, (see Figs. 16, 17:) If, say, five judges were to be elected, the five candidates of each party would be arranged in their proper vertical party-column and all the candidates of all the parties for this group office would be arranged in horizontal lines. Instead of now using an angle-bar lock, as 83, which prevents two candidates in the same horizontal row being voted for, we employ a straight horizontal sliding bar, as 85, for each horizontal row of the group. Each bar 85 is supported to slide in suitable guides on the back of frame B and is connected at one end to a short rockable ⊥-shaped lever 86. The bar is movable in either direction by means of a third pin 87 on the key-stem, which engages a lug 88 on the bar. The ⊥-lever 86 is fulcrumed to frame B at 89, and the ends of the horizontal arms of the lever engage beneath stops 90 on respective sliding dogs 91 92. A spring 93, assisted by gravity, normally holds the dogs down with both of them resting on the lever 86 and tending to keep vertical the slotted arm which is connected to bar 85. Consequently when any key of this horizontal series is turned down to vote the pin 87 will engage lug 88 to reciprocate bar 85 to the left, rock lever 86, and lift dog 91. Before, however, the key is turned its full distance the pin 87 will slip off of lug 88, the bar will fly back to normal position, and dog 91 will drop. If the same key is then turned back, the bar 85 will be moved in the opposite direction and dog 92 lifted, each complete movement in either direction of a key causing the bar first to be engaged and then to be released. When dog 91 is lifted, it causes a pivoted part 93 to engage a tooth of a five-pointed star-wheel 94 to turn the same one step in one direction. Likewise when the dog 92 lifts it causes a pivoted member 95 to engage the opposite side of the star-wheel to turn it in the opposite direction. Likewise when the dog 92 lifts it causes a pivoted member 95 to engage the opposite side of the star-wheel to turn it in the opposite direction. There is no movement of the star-wheel when either dog drops. The star-wheel is provided with a pinion 96, engaging a sliding rack 97, having any desired number of teeth. This rack is raised one tooth-space at each actuation of dog 91 and is dropped one tooth-space at each actuation of dog 92. Obviously an actuation of dog 92 can only succeed an actuation of dog 91. The rack 97 is adapted to be set for a single candidate or for any desired number of candidates represented by the total number of the group. The rack is set by interposing a suitable stop in the path of the rack. This stop is here shown as a block 98, adjustable in guide 99, in which the rack slides. The rack is perforated at 100 to receive a screw 101, by which the rack is held in position. The perforations 100 are spaced correspondingly with the rack movement, so that if the rack is to be set for five judges, the number in the group, the screw 101 is engaged in the fifth hole from the bottom. If desired, the stop member 98 may carry a bell 102. When the rack is raised its permitted distance, a part 103 strikes the bell to warn the voter.

In explaining the operation of the straight-ticket keys 6 reference is had to the following, Figs. 1, 2, 4, 5, 6, 7: Arranged in front of the resetting-carriage C are as many pairs of parallel vertical sliding bars 104 105 as there are straight keys, with one bar 104 on one side of a row and proximate to the key-stems in said row and the other bar 105 on the other side of the row and proximate to its stems. These bars are suitably mounted for reciprocation in guides 106 on frame B. Bar 105, which we shall term the "vertical straight locking-bar," is pivoted at its upper end to a bell-crank lever 107, which is fulcrumed at 108 to frame B. The other arm of the bell-crank lever operates to engage a notch 108 in a latch member 109, which is pivoted to a slidable bar 110, which we shall term the "horizontal straight locking-bar." The stem of a straight-ticket key has five cams—to wit, 111 112 113 114 115. Cam 111 operates before the others to engage a spring-retracted swinging locking-bar 116, Figs. 13, 14, which is hung at one end by a latch 117 from the previously-mentioned operating-bar $b'$ and has the other end sliding in a guide 118. The bar $b'$, it will be remembered, is adapted, when reciprocated, to lift the resetting-carriage C through the medium of the connection $c\ c'$. Latch 117 is pivoted both to bar $b'$ and to bar 116 and normally engages behind a stationary abutment 119 to prevent movement of bar $b'$ or of carriage C. Lifting latch 117 to clear the stop 119 permits bar $b'$ to move, and the carriage C to be lifted. This lift, however, needs be and necessarily is but slight and is for the purpose only of allowing the lugs 23 and 34, Figs. 8, 10, 11, 12, on bars 18 17 to clear the respective cams 22 33 on the key-stem, and thus permit all the keys of the party voted to turn simultaneously. This lifting is partly done by cam 111 and partly by cam 112. Bar $b'$ is cut out, as at 120, to form a stop 120' for the cam 111 to contact with after raising the lock-bar 116. The stop 120', however, is so disposed relative to the arc described by the end of cam 111 that only a slight reciprocating movement is given to bar $b'$, since if the carriage C is raised too high it will cause the resulting stops 150 151 (hereinafter described) on the carriage to interfere with cams 22 152 on the key-stems and prevent the proper operation of the keys. The cam 112, while not absolutely necessary, is intended to supplement cam 111 in raising the carriage by engaging under the top bar of the carriage and holding the latter up as long as the straight key remains down or voted. The turning and voting of all the party-keys in the column of the straight key voted is done by lifting the bar 104. Bars 104 and 105 have each as many projections 121 122, respectively, as there are keys in this party-column, and each projection is disposed underneath an end of a respective arm 123 124 on a key-stem. The result is that lifting-bar 104 turns all the keys in that column into voted position. Lifting-bar 105 reverses all the keys or else prevents their being voted, since bar 105 has both these functions at different times, as will be seen shortly. Succeeding the release of the latch 117 and the raising of carriage C by the cams 111 112 cam 113 trips the latch 109 and releases the member 107 on the companion bar 105 from its notch 108, thus permitting bar 110 to move to the right, Figs. 4, 5, 6, without raising said companion bar 105, but raising, as indicated in Fig. 7, all the bars 105 of the other political parties. The reciprocation of bar 110 is done by the fourth cam 114 engaging a notch 125 in the under side of bar 110, and the latter is held against return movement by the engagement of the convexity 126 on the stem with the concavity 127 in the bar 110. The concluding movement of the straight key when being voted causes the cam 115 to engage a notch 128 in bar 104 to lift all the arms 123 and turn all the keys in that party-column to indicate a vote for each corresponding candidate. The bar is held up by means of the convexity 129 on the stem of the straight key engaging in the concavity 130 in the bar.

In Figs. 4, 5, 6 are shown three views representing the different positions of the same pair of bars 104 105 and of the same straight key. Fig. 7 shows the position of the keys and bars of all the other political parties. Fig. 4 shows the parts in normal position ready for voting. Fig. 5 shows the latch 109 lifted and the bar 110 ready to be moved, and Fig. 6 shows the parts belonging to the same straight key in position after being voted. From Fig. 7 it will be observed that the movement of bar 110 by the straight key of Figs. 4, 5, 6 has caused the latches 109 of the other straight keys to pull over on their levers 107 and lift up their corresponding bars 105, and so lock all the keys of all the parties except that one voted.

As shown in Fig. 7, the bars 104 of all the parties not voted remain in their original position. Hence it is observed that when a straight key is voted its bar 104 only is moved and all the other bars 104 of all the other parties are unaffected, and also that its bar 105 is unaffected, but all the other bars 105 of all the other parties are affected.

To reverse a straight-ticket vote, the straight-ticket key must be pushed upward to its normal position. This, however, still leaves all the keys of that party depressed, (all other party-keys being in their normal position,) and if the voter should stop at that he would still be voting the straight ticket, notwithstanding he had reversed the straight key. To change, then, and vote a mixed ticket, if the voter wishes to change his mind, he must raise such of the voted or depressed keys as represent candidates which he desires to scratch, which unlocks and reverses all the other keys of that party which he had just voted straight and leaves him at liberty to begin afresh and vote for any one he wants to.

Referring to Figs. 2, 24, 25, 26, if a voter desires not to vote for any of the regular candidates for some one or more of the offices, but to vote for an outsider whose name does not appear on the machine, he may do so by pushing down on the proper independent key 8 in the independent column, which will raise a curtain-plate 131, normally closing an aperture 132 in the face-plate 4, and there will be disclosed a strip of paper on which the voter may write the name of the person of his choice. The paper is supported on rolls 133 134 and is drawn step by step across the aperture 132 by suitable mechanism at each actuation of the key 8. The curtain-plate 131 is pivoted at 135 behind the plate 4 and is oscillated by means of a pin in an arm 136 on the stem of key 8 engaging an irregular cam-slot 137 in the plate. The shape, length, and disposition of the slot are such that the plate will not be lifted to uncover the paper until the key has nearly completed its movement. The step-by-step movement of roll 134 to wind the paper onto it and off of roll 133 is done by the following means: Roll 134 carries a ratchet 138. A lever 139, fulcrumed loose on the axle of roll 134, carries a spring-pressed pawl 140, engaging the ratchet. A slide 141 has a notch in which the lever 139 engages. One end of the slide is supported in a guide 142 to permit the slide a certain rocking or oscillating movement to carry it radially of roll 134. The slide is reciprocated by a suitable stop-movement contrivance 143 with the stem of key 8. Thus turning key 8 down into voted position, or to the right, lifts the curtain-plate 131, pushes down on slide 141, and rocks lever 139. When the key is reversed, the pawl 140 engages ratchet 138, turns roll 134, and moves a fresh portion of paper across the opening 132. As the lower roll 134 continually grows in size it is obvious that if the ratchet is moved uniformly the same distance each time there will be a gradually-increasing length of paper wound onto the roll each time the pawl takes hold. In order to obviate this, we provide an equalizer 144, which consists of a lateral extension on the slide 141, bearing continually on the surface of the paper on roll 134. A spring 145 holds the equalizer to the roll, but allows the slide to turn on its pivotal support in the guide 142 as the roll 134 increases in size. Since the length of the reciprocation of the slide remains always the same, it is obvious that as the slide is moved out on lever 139 the length of the oscillation of the latter gradually shortens, and since this oscillatory movement may be adjusted proportionately to the rotative movement of the roll it is possible to move always the same length of paper across the opening 132 at each actuation of the roll-operating means. Each independent key 8 acts on a horizontal locking-bar 17 and on a vertical locking-bar 18 just like all the "regular" keys and for the same purpose, and the independent keys of the groups connect with the sliding bars 85, and the independent keys of the single-candidate series operate respective angle-bars 83. Since the statutes of some of the States require that every machine must provide for independent voting, this independent-voting mechanism becomes an essential feature of an operative machine. However, we do not intend in the present application to claim our independent-voting mechanism *per se*, but only describe it here to show its necessary connection with the rest of the apparatus and claim it only in such general combination. A separate application is on file or is about to be filed in which said mechanism is more particularly described and claimed. When a voter has turned the key 8 to uncover the paper in opening 132, he may write the name of whomsoever he pleases for the particular office corresponding to the horizontal line in which key 8 is. The paper is supported for writing purposes by a plate 146. If what the voter writes does not suit him, he may raise the key, which will act to pull down a fresh surface of the paper over plate 146 and a puncturing-tool 147 will cancel the name just written. This puncturing or canceling device consists of an angular bar pivoted at 148 and operating through a slot in plate 146 below opening 132. It has a knife-edge projection 149, which is normally projected beyond the surface of the supporting-plate 146. Hence it is seen that if the paper is drawn down when the projection 149 is in this position the paper will be cut through that portion just previously disclosed through aperture 132 and will indicate the cancellation of that vote. The voter can then write another name or he can vote for one of the regular candidates for that particular office by operating the proper key. If he wishes his written vote to stand, the puncturing-tool is retracted out of range of the paper by suitable mechanism, when the independent key, with all the other keys, is reset after the voter has concluded voting.

The resetting of the independent keys, like the resetting of all the regular keys 5 5', is done by the carriage C, which is lifted by the closing of the door.

Referring to Figs. 8, 9, 10, 11, 12, the carriage is provided with stops 150 151, disposed relative to the stems of all of said keys. When a key is in a voted position, as indicated in Fig. 12, the cam 22 is in the path of but enough above stop 151 so that the carriage may be lifted slightly, as previously described, by the cams 111 112 when a straight ticket is voted, and a cam 152 (behind bar 18) is in the path of but also slightly above and out of contact with stop 150. Cam 152 is really only a starter for the key, since cam 22 is so short that the leverage is hardly sufficient to operate the key, especially when it is considered how many keys there may be to turn and what the resulting load on the carriage would be.

Lifting the carriage C to its full limit resets all the regular keys 5 5' and all the independent keys 8.

Before describing how the carriage C is lifted it will be necessary briefly to detail the resetting mechanisms of the questions-keys 7 and the means which operate the puncturing-tool 147 and allow the paper from roll 133 to be drawn down without tearing it. The questions-keys 7 are reset by a carriage G, Figs. 2, 13, 14, on much the same principle as that shown in connection with carriage C, except that the stems of the questions-keys have each but one cam 153 to be engaged by a single lug 154 on the carriage G. The latter is slidable vertically, like carriage C, on suitable guides on frame B. The resetting of the straight-ticket keys 6 is shown as accomplished by means of the arms 155 on carriage G, having rack-teeth 156 to engage the mutilated gears 157 on the stems of keys 6. Normally with carriage G down the racks 156 are carried below the gears 157, so that the straight keys are free to be operated by the voter. If the straight keys are not used by the voter, the teeth on the gears 157 remain out of the range of the rack-teeth 156 when frame G is lifted; but if a straight key has been voted a rack 156 will engage the gear of this key and turn the latter back to place when carriage G is raised. Connected to carriage G is a bar 158, which has a longitudinal cam-slot 159, in which the perforator-bar 147 is engaged near the pivoted end of the latter. The bar 158 is suitably supported for reciprocation in guides on frame B, and the shape of the slot 150 is such that whenever 158 is lifted the perforator 147 will be rocked backward on its pivot to carry the perforating-point 149 away from any possible interference with the paper which is wound off of roll 133 onto roll 134.

The movement of the two carriages G and C is so timed that the former will move upward before the latter begins its movement, as to fully retract the perforator before the carriage G has a chance to reverse the independent key, because, as we have seen, if the perforator is not drawn back before the key 8 is turned back the paper will be torn and the vote canceled. While any suitable means might be provided to lift the carriages G and C and so reset the machine, preferably, and as we have here shown, the raising of these carriages, like the operation of the several registers to indicate a tally, is done by the closing and opening of the door 2.

Referring to Figs. 3, 13, 14, to raise the carriages the inside of the door has adjacent to its back edge a bracket 160, provided with a perforated lug 161, through which a rod 162 is slidable. The rod 162 has two spaced stops 163 164, one on each side of the perforated lug 161. The stop 163 is engaged by the lug when the door is nearly opened to pull on the rod 162 and rock a lever 165 in one direction, and the stop 164 is engaged by the lug 161 when the door is nearly closed to rock the lever 165 in the opposite direction. The lever 165 is pivoted at 166 and has connected intermediate of its ends a rack 167, sliding in a guide 168 on frame B and having teeth engaging a pinion 169. Pinion 169 carries a crank-arm 170, to which is connected an end of a pitman 171. The other end of the pitman connects with a rocking plate 172, which is fulcrumed at 173 on frame B. Carriage G is suspended from plate 172 by a link 174. Connected also to plate 172 is a rack-bar 175, sliding in suitable guides and having rack-teeth engaging a pinion 176, which is journaled on frame B. Pinion 176 is provided with a cam 177, adapted when the pinion is rotated to swing up into a notch in the operating-bar $b'$ and successively engage the lock-bar 116 and shoulder portion 178 on the bar $b'$. The contact with the lock-bar 116 serves to lift the latch 117 and allow the bar $b'$ to be moved by the cam 177 to the right. As we have seen, such a movement of the bar $b'$ will result, through the medium of the connection $c'$, to lift the carriage C. The cam 177 is of sufficient length and the shoulder 178 is so disposed relative to the path of movement of the cam that when the pinion 176 is rotated the full space (as it is intended to) the bar $b'$ will have been moved far enough to the right to insure the full lifting of the carriage C and the reversal of all the regular keys in the manner previously described. Thus it will be seen that closing the door will cause the lug 161 to engage the stop 164, push over lever 165, and pull out the rack 167. This will rock the pinion 169 and plate 172 to lift frame G, retract the perforator 147, reverse the straight-ticket keys, reciprocate bar $b'$, and reset every key in the machine. When the door is fully open-lug 161 engages plate 163 to reverse the movement of the several connections and allow the frames G and C to fall and for the perforating-bar 147 to be thrown outward again in contact with but not to pierce the paper.

The following connections between the door and the carrier E are employed for the purpose of moving the carrier to transfer the register-wheels of the several register mechanisms away from the racks 36 45 47 and into engagement with the racks 54 55 56. Referring to Figs. 3, 20, the door is provided adjacent to its back edge with a plate 179, having an irregular cam-slot 180. A lever 181 has a pin projection at one end engaging in the slot 180 and is fulcrumed at the other end at 182 to a bracket 183 on the inside of the cabinet. The shape and arrangement of the plate 179 and its slot 180 are such that the door is permitted a considerable pivotal movement to open or close without affecting the lever 181; but just as the door is nearly closed the lever will be rocked to pull back on a link 182, which is connected to it and to a crank 184, which is journaled on the frame D. Crank 184 has two arms, one which connects with the link 182 and the other set at about right angles to the first arm, which engages in a slot in the carrier E. Thus it will be seen that if the door is closed the crank 184 will be rocked to raise the frame E, which turns outward on the link 39 to carry the register-wheels out of engagement with the racks 36 45 47 and into mesh with the rack 54 55 56.

The operation of the machine is as follows: With the front door fully opened the entire machine is reset in readiness for a voter. The voter expresses his choice for a candidate on any of the tickets by turning to the right a trifle over a quarter of a circle the key of that particular candidate. This operation is repeated for the other candidates of his choice until he has voted for as many as the law allows him to vote for or as he may wish to vote for and within the legal limit of time. Should he desire to change any vote so cast by him, all he has to do is to turn back the key as far as it will go of the candidate whose vote he wishes to alter. This change of votes may go on as long as he is allowed to remain at the machine, and at the same time when he is through only a single candidate for a single-candidate office will be voted for, and no more than the correct number of votes will be cast for any group-candidate office. As we have seen, the turning of a regular key operates the horizontal and vertical locking-bars 17 18 to prevent the simultaneous actuation of any two regular keys, and the angular locking-bar 83, Fig. 17, prevents more than one single-candidate key in the same horizontal row being voted by the same voter. With the group-candidate voting the sliding bar 85 permits the voter to vote a mixed ticket and to vote two or more candidates of different parties, which candidates may be represented by keys in the same horizontal line; but it is to be understood that while the bar 85 allows two keys in the same horizontal line to be voted they must be voted successively, since the front bars 17 18, as we have seen, prevent their simultaneous actuation. At the same time the rack 97 and the stop 98 will prevent him from voting for more than the correct number in the group. It is readily understood from the previous description that the turning of any of the regular straight or independent keys operates through the racks 36 45 47 to turn the register-wheels, but that the final registration is not made until the carrier E is thrown rearward to disengage the wheels from said racks and allow such of the latter as have been left to fall back to place. The straight-ticket voting by the keys 6, the questions or yes and no voting by the keys 7, the independent voting by the keys 8, and the reversing of any of the same are readily understood from the previous description and need not be repeated. When a voter has voted to his satisfaction or been at the machine the limited time allowed by law, he closes the front door and retires. Shutting the door, as we have seen, raises the carriers C and G to reset all the keys that have been voted, and at the same time holding all these keys against being turned or tampered with in any way while the door is closed, and also actuating the total-vote mechanism. Closing the door also operates the carrier E to disengage all the register-wheels from the front sliding racks by throwing back the carrier in which all the register-wheels are contained and causing the register-wheels instantly and before becoming wholly disengaged from the front racks to become engaged by the rigid racks 54 55 56 on the opposite or rear sides of the wheels, which engagement prevents said wheels from moving in any direction or from being tampered with and leaves them in such position that an imprint or impression can be taken from them. The raising of the carriage G also operates the total-vote-register mechanism, of which only the key-stem 185 is here shown, (there being of course no total-vote key.) This total-vote stem is operated by means of an arm 186, projecting between and engaged by two lugs 187 188 on the carriage G. When carriage G is dropped by the opening of the door, the upper lug 187 catches the arm 186 and turns the key-stem a quarter-circle, which operates a sliding rack and register similarly as hereinbefore described. The raising of the carriage G by the closing of the door causes the lower lug 188 to turn the stem 185 back to its normal position any time when said key-stem is disengaged from the tooth-rack connected with the register-wheel. Every opening and closing of the door operates this total-vote mechanism, and every opening of the door records one unit of the total-vote register. At the same time that the carriage C is raised by the closing of the door to reset and lock the keys the group-locking racks 97 are returned to their normal position by the retraction of a spring-pressed pawl 189, which is at all other times in engagement with the pinion 96. The pawl 189 is rounded at the end which engages in the teeth of the pinion 96 and bears with sufficient force against the pinion to prevent the rack 97 falling of its own weight. At the same time the pinion is capable of being turned in either direction, according to the actuation of one or the other dogs 91 92.

With the front door closed tight an imprint or as many impressions as desired may be taken to show the status of the several sets of register-wheels. The words "total vote," the questions, the name of officers and candidates, and all other matter necessary or deemed proper are put in type on the back plate 53 and above the respective register-wheels, correspondingly with the same on the front or voting part of the machine.

To reset the register-wheels after the machine has been used and to put it in readiness for the next election, the front door must be closed and the back door opened. Opening the back door carries the frame F and its attachments out of the way, giving access to the racks 54 55 56. These racks while stationary and rigid at all times during the use of the machine at the polls are capable of being raised to carry their racking-surfaces entirely free of their respective pinions on the register-wheels for the purpose of allowing the register-wheels to be turned back to zero. Accordingly the racks 54 55 56 are connected at their upper end to a cross-head 190, while the racks are supported to slide in suitable guides 191 on the frame D. A jack-screw 192, arranged in line with a suitable opening in the top of the cabinet, passes through the cross-head and a bracket 193 on frame D. By inserting a screw-driver or other suitable instrument through this hole in the top of the cabinet engaging the jack-screw the latter may be turned, which will raise the racks 54 55 56. Then by means of a brush or by drawing the fingers downward over the face of the register-wheels the latter will freely roll around until a pin 194, set laterally in each register-wheel, comes in contact with a corresponding stop 195 on each rack-bar. These pins and stops are so disposed relative to each other that when all the register-wheels are prevented from further turning by means of the stops 195 each register-wheel will stand at "9." By turning screw 192 then in the other direction and lowering the racks to normal position rolls the wheels one unit-space, so that zero will show on each of the register-wheels through the opening in the plate 53.

It is possible that various modifications in our invention may be made without departing from the principle thereof, and we do not wish to be understood as limiting ourselves to the specific construction as herein shown and described.

Having thus described our invention, what we claim, and desire to secure by Letters Patent, is—

1. In a voting-machine, the combination of a series of keys representative of a party-ticket, a straight-ticket-voting key corresponding thereto, means including a reciprocating bar operated through the medium of the straight-ticket-voting key to vote all the keys of said series, means including a second reciprocating bar operative by the straight-ticket-voting key to reverse the previously-voted keys, and register mechanisms operatable by said keys.

2. In a voting-machine, the combination of single-candidate-voting keys, group-candidate-voting keys, register mechanisms operable by said keys, and means by which the single-candidate-voting keys are adaptable as group-candidate-voting keys, said last-named means including interchangeable straight sliding bars and rockable angle-bars.

3. In a voting-machine, the combination of a voting-key, a register mechanism operated thereby, said mechanism including a plurality of interconnected register-wheels, a sliding rack operated by said voting-key engageable with one of said register-wheels, and other sliding racks engageable with the other wheels and operated through the medium of the first wheel to actuate said other wheels.

4. In a voting-machine, the combination of a voting-key, a register mechanism operated thereby, said mechanism including a plurality of interconnected register-wheels, a sliding rack operated by said voting-key engageable with one of said register-wheels, and other sliding racks engageable with the other wheels and operated through the medium of the first wheel, a movable carriage for said wheel, and means to move the carriage to disengage the wheels from said racks.

5. In a voting-machine, the combination of a voting-key, a register mechanism operated thereby, said mechanism including a plurality of interconnected register-wheels, a sliding rack operated by said voting-key engageable with one of said register-wheels, and other sliding racks engageable with the other wheels and operated through the medium of the first wheel, a movable carriage for said wheel, means to move the carriage to disengage the wheels from said racks, and means to lock the wheels while disengaged from said racks.

6. In a voting-machine, the combination of a voting-key, a register mechanism operated thereby, said mechanism including a plurality of interconnected register-wheels, a sliding rack operated by said voting-key engageable with one of said register-wheels, and other sliding racks engageable with the other wheels and operated through the medium of the first wheel, a movable carriage for said wheels, means to move the carriage to disengage the wheels from said racks, and means to lock the wheels while disengaged from said racks, said last-named means including other racks engageable with said wheels.

7. In a voting-machine the combination of a rockable voting stem, a lug on said stem, a sliding rack engageable by said lug to reciprocate the rack on the oscillation of the key-stem, a register-wheel having a pinion engageable by the rack to rotate the wheel on the reciprocation of the rack and means to move the wheel toward and from the rack to carry the wheel into and out of engagement therewith.

8. In a voting-machine, the combination of a voting-key and a register mechanism operated thereby, said register mechanism comprising a register-wheel, a sliding rack engageable by the wheel, connections between the key and rack to reciprocate the latter, a movable carriage for the register-wheel, and a second rack between which and said first-named sliding rack, the said carriage is movable.

9. In a voting-machine, the combination of a voting-key and a register mechanism operated thereby, said register mechanism comprising a register-wheel, a sliding rack engageable by the wheel, connections between the key and rack to reciprocate the latter, a movable carriage for the register-wheel, a second rack between which and said first-named sliding rack, the said carriage is movable, and means to operate the second-mentioned rack to permit the register-wheel to be reset.

10. The combination with a register-wheel and its shaft, of a pinion on its shaft, a rack member on each side of said pinion, means to successively engage said racks with said pinion, and means to move the racks to turn the register-wheel one way or the other.

11. In a voting-machine, a voting-key and a register mechanism operatable thereby, said mechanism including two spaced opposed racks and an intermediate pinion, a hinged carriage for said register mechanism to move the mechanism into and out of operative position with respect to the key.

12. In a voting-machine the combination of a register-wheel, means including a movable rack member to rotate the wheel in one direction, means including a second rack member to lock the wheel against rotation in the opposite direction when disengaged from said first-mentioned rack member, and means to move the wheel into engagement with said racks alternately.

13. In a voting-machine the combination of a register-wheel, means including a movable rack member to rotate the wheel in one direction, means including a second rack member to lock the wheel against rotation in the opposite direction when disengaged from said first-mentioned rack member, and means to move the wheel into engagement with said racks alternately, said second-named rack member being movable to reset said register-wheel.

14. The combination with a register-wheel and its shaft, of a pinion on the shaft, a rack on each side of said pinion, means to engage the pinion successively with said racks, and means including a voting-key to move one of said racks to actuate the wheel.

15. The combination of two opposed rack members, a pinion between them and engageable with them alternately, a register-wheel operable by said pinion, and means to move the pinion into engagement with said racks.

16. The combination in a voting-machine of a cabinet, a closure therefor, a voting-key contained in the cabinet, a register mechanism operatable by the key, said voting mechanism including two opposed racks, one of which is operatable by the key, a pinion between the racks and means connected with the closure of the cabinet to move the pinion out of engagement with one rack and into engagement with the other rack.

17. In a voting-machine, a register mechanism including two racks, an interposed pinion, means to move the pinion to engage the racks alternately, said racks positioned to insure the engagement of the pinion with one rack before disengaging the other rack, and means to operate one rack to rotate the pinion.

18. In a vote-register mechanism, a sliding rack and a formally stationary rack, a pinion between the racks, means to move the pinion into engagement with said racks alternately, said racks positioned to insure the engagement of the pinion with one rack before it is disengaged from the other rack, and a key to operate the sliding rack.

19. In a voting-machine, a voting-key and a register mechanism operatable thereby, said voting-key comprising a rotatable part, said register mechanism including a sliding rack engageable by said rotatable part and a registering device operable by the rack, a hinged carriage supporting the register mechanism and movable into and out of operative position with respect to the key, and means to lock said carriage in fixed operative position with respect to the key.

20. In a voting-machine, the combination of a cabinet having a door, a voting-key, a sliding rack actuated by said key, a register-wheel operatable by said rack, a carriage for said register-wheel, and connections between said carriage and the door to move the carriage and carry the register-wheel out of engagement with the rack when the door is closed.

21. In a voting-machine, the combination of a cabinet having a door, a voting-key, a sliding rack actuated by said key, a register-wheel operatable by said rack, a carriage for said register-wheel, connections between said carriage and the door to move the carriage and carry the register-wheel out of engagement with the rack when the door is closed, and means including a second rack parallel with and facing said first-named rack to lock the wheel against movement when said door is closed.

22. In a voting-machine, the combination of a rotatable voting-key, a stem therefor, a register mechanism operatable by the stem, means for disconnecting the register mechanism from said stem to permit the key to be reset without affecting the register mechanism, means for resetting said key, said last-named means including a movable carriage, stop means on the carriage engaging an arm on the key-stem, and means to operate the carriage.

23. In a voting-machine, the combination of a rotatable voting-key, a stem therefor, a register mechanism operatable by the stem, means for disconnecting the register mechanism from said stem to permit the key to be reset without affecting the register mechanism, means for resetting said key, said last-named means including a movable carriage, stop means on the carriage engaging an arm on the key-stem, and means to operate the carriage coördinately with the operation of the means for disconnecting the register mechanism from the stem.

24. In a voting-machine, the combination of rockable voting-keys, stems therefor, register mechanisms connected with the keys, horizontal and vertical locking-bars operatable by the keys to prevent the simultaneous actuation of two or more keys, a movable carriage for said locking-bars, means for moving the carriage, and means on the carriage engaging the key-stem to reset the keys.

25. In a voting-machine, the combination of rockable voting-keys, stems therefor, register mechanisms connected with the keys, horizontal and vertical locking-bars operatable by the keys to prevent the simultaneous actuation of two or more keys, a movable carriage for said locking-bars, means for moving the carriage, means on the carriage engaging the key-stem to reset the keys, and means for disconnecting the register mechanisms from the key-stems to allow the latter to be reset without affecting the mechanisms.

26. In a voting-machine, the combination of rockable voting-keys, stems therefor, register mechanisms connected with the keys, horizontal and vertical locking-bars operatable by the keys to prevent the simultaneous actuation of two or more keys, a movable carriage for said locking-bars, means for moving the carriage, means on the carriage engaging the key-stem to reset the keys, means for disconnecting the register mechanisms from the key-stems to allow the latter to be reset without affecting the mechanisms, and means for giving the said carriage and said register-disconnecting means a coördinate movement.

27. In a voting-machine, the combination of rockable voting-keys having stems, register-wheels, racks actuated by said stems to operate said wheels, a carrier for said wheels to move the latter in and out of engagement with said racks, other racks to lock said wheels when disengaged from said first-named racks, a resetting-carriage, a containing-cabinet, a door therefor, and means operated by the door for actuating the register-mechanism carrier and the resetting-carriage.

28. In a voting-machine, the combination of regular-candidate-voting keys, independent-candidate-voting keys, questions-voting keys, register mechanisms operatable by said keys, a resetting-carriage for the regular-candidate-voting keys, a resetting-carriage for the questions-voting keys, resetting connections between one of said carriages and the independent-voting keys, and means for operating the several resetting means.

29. In a voting-machine the combination of regular-candidate-voting keys, straight-ticket-voting keys, questions-voting keys, independent-candidate-voting keys, register mechanisms operated by said several keys, a resetting-carriage for the questions-keys, a resetting-carriage for the regular-candidate keys, means carried by the questions-resetting carriage to reset the straight-ticket-voting keys, connections between one of said carriages and the independent-voting keys to reset the latter, and means to operate said carriages.

30. In a voting-machine, the combination of regular-candidate-voting keys, straight-ticket-voting keys, register mechanisms operated thereby, and means to reset such of said keys as have been voted, said means including a movable carriage, a locking-bar connected with the carriage and provided with means normally preventing the operation of said resetting-carriage, and means to reciprocate said bar to move the carriage.

31. In a voting-machine, the combination of regular-candidate-voting keys, questions-voting keys, register mechanisms operatable thereby, means to disconnect said register mechanisms to permit such of said keys as have been voted to be reset, said means including a resetting-carriage for the questions-keys, a separate carriage for the regular-candidate keys, an operating-bar mounted for reciprocatory movement connected with the regular-candidate resetting-carriage, lock mechanism carried by the operating-bar normally preventing the operation of said resetting-carriage, and means to operate the questions-keys-resetting carriage, and to actuate said operating-bar to move the resetting-carriage for the regular-candidate keys.

32. In a voting-machine, the combination of a regular-candidate-voting key, a corresponding independent-candidate-voting key, register mechanisms operated by said keys, questions-voting keys, register mechanisms operatable by said questions-keys, respective resetting-carriages for the questions-keys and the regular-candidate key, connections between the questions-keys carriage and the independent-voting mechanism, a containing cabinet, a door therefor, and connections with the door to operate said carriages to reset said keys.

33. In a voting-machine, the combination of a series of regular-candidate keys representing the candidates of a particular party, a straight-ticket-voting key corresponding thereto, register mechanisms operatable by said keys, said several keys having rockable stems, bars on each side of the stems of the several keys, projections on said bars, arms on the regular-candidate-key stems engageable by said projections, and means for reciprocating said bars through the medium of the straight-ticket-voting key.

34. In a voting-machine, the combination of a series of voting-keys representing the candidates of a party, a straight-ticket-voting key corresponding thereto, register mechanisms operatable by said keys, and means including a sliding bar engageable by the straight-ticket-voting key to operate the several keys of said series, and a second sliding bar engageable with the keys to reset them, and means to operate said second sliding bar.

35. In a voting-machine, the combination of a series of voting-keys representing the candidates of a party, a straight-ticket-voting key corresponding thereto, register mechanisms operatable by said keys, means including a sliding bar engageable by the straight-ticket-voting key to operate the several keys of said series, another series of regular-candidate-voting keys and a straight-ticket-voting key therefor, and means whereby on the operation of the first-named straight-ticket-voting key, the keys in said other series are locked against movement, said last-named means including a sliding bar movable oppositely to the first-mentioned sliding bar.

36. In a voting-machine, the combination of a series of voting-keys representing the candidates of a particular party, a straight-ticket-voting key corresponding thereto, register mechanism operatable by said keys, other voting mechanisms, means including a sliding bar operated through the medium of the straight-ticket-voting key to actuate the several keys of said series, and means operating in a direction opposite to the first-named sliding bar to reset said keys.

37. In a voting-machine, a series of rockable key-stems, respective register mechanisms operatable by said stems, a sliding carriage having means to engage the stems to rock the latter when the carriage is moved in one direction, a bar operating transverse to the direction of movement of said carriage, connections between the carriage and bar, and means to reciprocate the bar to operate the carriage.

38. In a voting-machine, a series of rockable key-stems, respective register mechanisms operatable by said stems, a sliding carriage having means to engage the stems to rock the latter when the carriage is moved in one direction, a bar operating transverse to the direction of movement of said carriage, connections between the carriage and bar, means to reciprocate the bar to operate the carriage, and means on the bar to lock the carriage normally against movement.

39. In a voting-machine, a series of voting-keys representing the candidates of a particular party, a straight-ticket-voting key, register mechanisms operatable by said keys, a sliding bar arranged on each side of the series of keys and operatable by the straight-ticket key to actuate the several candidate-keys in unison, a second series of voting-keys representing candidates of a different party, and means including a sliding bar with stops to engage said second series of keys to lock the latter on the operating of the first-mentioned sliding bar.

40. In a voting-machine, the combination of a plurality of series of voting-keys, the keys in each series representing the candidates of a particular party, a straight-ticket-voting key corresponding to each series, sliding bars arranged in pairs on each side of the keys of a series, one of said bars engageable by its straight-ticket-voting key and reciprocal thereby, means on said bar engaging means connected with the several keys of the series to operate the latter when said bar is reciprocated, and means operating through the medium of the other bar to lock all the keys of the other series.

41. In a voting-machine, the combination of regular-candidate-voting keys, independent-candidate-voting keys, questions-voting keys, register mechanisms operatable by said keys, a resetting-carriage for the regular-candidate-voting keys, a resetting-carriage for the questions-voting keys, resetting connections between one of said carriages and the independent-candidate-voting keys, and a total-vote-register mechanism operatable by one of said carriages.

42. In a voting-machine, the combination of single-candidate-voting mechanisms, group-candidate-voting mechanisms, straight-ticket-voting mechanisms, questions-voting mechanisms, independent-candidate-voting mechanisms, a total-vote-register mechanism, a containing-cabinet, a door for the cabinet, and means connected with the door and operatable thereby to reset said voting mechanisms and actuate said total-vote-register mechanism, said means including a sliding carriage, a bell-crank connected with the carriage and operative connections between the bell-crank and door and between the carriage and said several mechanisms.

43. In a voting-machine, the combination of a regular-candidate-voting mechanism and an independent-candidate-voting mechanism, said mechanisms each including a rockable stem, lugs on said stems, a sliding horizontal bar, and a vertical sliding bar engageable and operative by the lugs on the stem of the independent-candidate-voting mechanism to lock the stem of the regular-candidate-voting mechanism.

44. In a voting-machine, the combination of a cabinet having a door, a regular-candidate-voting mechanism, and an independent-candidate-voting mechanism, said independent-candidate-voting mechanism including means to hold a strip of paper and a vote-canceling device in conjunction with the strip of paper, connections between the regular-candidate-voting mechanism and the independent-voting mechanism whereby on the operation of one the other is locked, and connections between the door and said canceling device for operating the latter, and means operated by the door to reset said voting mechanisms.

In testimony whereof we have hereunto set our hands in presence of two subscribing witnesses.

WILLIAM M. CUTTER.
WILLIS A. SUTFIN.

Witnesses:
WALLACE DINSMORE,
J. R. GARRETT.